(12) United States Patent
Lamphere et al.

(10) Patent No.: US 8,161,641 B2
(45) Date of Patent: Apr. 24, 2012

(54) COMPOUND ELECTROMACHINING (75) Inventors: Michael Scott Lamphere, Hooksett, NH (US); Bin Wei, Mechanicville, NY (US); Thomas Walter Rogenski, Rutland, VT (US); Dan Stewart Dale, Leicester, VT (US); Jonathan Sebastian Janssen, Troy, NY (US); Jeffrey Francis Wessels, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1679 days.

(21) Appl. No.: 11/489,350

(22) Filed: Jul. 19, 2006

(65) Prior Publication Data

US 2008/0028607 A1 Feb. 7, 2008

(51) Int. Cl.
*B21D 53/78* (2006.01)
*B23P 13/04* (2006.01)

(52) U.S. Cl. .............. 29/889.7; 29/557; 29/558

(58) Field of Classification Search ............. 29/889.7, 29/557, 558; 204/228.1; 205/640, 658, 660, 205/664, 665, 666, 668; 219/68, 69.1, 69.11, 219/69.15, 71
See application file for complete search history.

(56) References Cited

U.S. PATENT DOCUMENTS

| 3,755,127 | A | * | 8/1973 | Tyler et al. | 204/224 M |
|---|---|---|---|---|---|
| 4,851,090 | A | * | 7/1989 | Burns et al. | 205/670 |
| 5,149,405 | A | * | 9/1992 | Bruns et al. | 205/686 |
| 5,893,984 | A | * | 4/1999 | Thompson | 219/69.15 |
| 6,562,227 | B2 | * | 5/2003 | Lamphere et al. | 205/686 |
| 6,680,454 | B1 | * | 1/2004 | Batzinger et al. | 219/69.15 |
| 6,787,728 | B2 | * | 9/2004 | Wei et al. | 219/69.15 |
| 6,858,125 | B2 | * | 2/2005 | Wei et al. | 205/652 |
| 2002/0066973 | A1 | * | 6/2002 | Visconti et al. | 264/138 |
| 2008/0028607 | A1 | * | 2/2008 | Lamphere et al. | 29/889.7 |
| 2009/0226788 | A1 | * | 9/2009 | Krings et al. | 429/30 |

FOREIGN PATENT DOCUMENTS

| CA | 2502593 A1 | 9/2006 |
|---|---|---|
| GB | 2021645 A | 5/1979 |

\* cited by examiner

*Primary Examiner* — David Angwin
(74) *Attorney, Agent, or Firm* — David J. Clement; Trego, Hines & Ladenheim, PLLC (57) ABSTRACT

A preform includes an airfoil stub and a dovetail hub. The hub first undergoes electrochemical discharge machining to form a rough dovetail. The airfoil stub undergoes electrochemical machining to form an airfoil. The rough dovetail then undergoes electrochemical discharge machining to form a rough tang. The rough tang is finish machined to form a dovetail extending from the airfoil in a unitary rotor blade.

43 Claims, 3 Drawing Sheets

COMPOUND ELECTROMACHINING

BACKGROUND OF THE INVENTION

The present invention relates generally to machining, and, more specifically, to electrical erosion machining.

Modern gas turbine engines include multiple rows of rotor blades mounted to the perimeter of a supporting rotor disk. Compressor blades are used for pressurizing air in the compressor, and turbine blades are used for expanding combustion gases for powering the supporting disk.

A high pressure turbine powers the compressor through a drive shaft extending therebetween. And a low pressure turbine powers an upstream fan in a turbofan aircraft engine application. In marine and industrial applications, the low pressure turbine powers an external drive shaft for powering a marine propeller or an electrical generator, for example.

The gas turbine engine includes many stages of compressor and turbine blades. A multitude of such blades are therefore found therein. The blades in each stage or row are identical to each other, and typically vary in size from stage to stage.

Various manufacturing processes are available for efficiently manufacturing compressor and turbine blades, yet nevertheless the multitude of such blades requires a substantial expenditure of resources and time, which affect the rate of production and cost of the final engines.

Compressor blades are typically solid, superalloy metals initially manufactured from a respective preform. The preform is typically made from bar stock by an upsetting process that plastically deforms the metal to form a relatively large dovetail hub and integral, relatively thin airfoil stub. The preform includes excess material around its full perimeter so that the final configuration of the rotor blade may be suitably machined therefrom.

However, these preforms are made of superalloy metals, such as nickel based superalloys, which have enhanced strength for use in the gas turbine engine, which enhanced strength increases the difficulty of machining metal during the manufacturing process.

The airfoil of the blade must be precisely machined for achieving the generally concave pressure side thereof and the opposite, generally convex suction side that extend in span from root to tip and extend in chord between opposite leading and trailing edges.

The dovetail of the blade is also precisely machined to form a pair of opposite lobes or tangs having the typical dovetail shape for mounting the individual blades in corresponding dovetail slots in the perimeter of a supporting rotor disk. The dovetails may either be axial-entry supported in axial slots in the rim of the rotor disk, or may be circumferential-entry and supported in a circumferential dovetail slot extending around the rim of the rotor disk.

Accordingly, the airfoil and dovetail are configured differently from each other, yet nevertheless must have precise configurations relative to each other for being accurately supported to the perimeter of the rotor disk in efficiently performing their compression function on the air channeled through the compressor during operation, while withstanding the substantial aerodynamic and centrifugal loads experienced during operation.

In one conventional manufacturing process for compressor rotor blades being commercially used in the United States for many years, the compressor blades are formed in a series of processes. Firstly, the preform described above is fixtured around its airfoil stub and then the dovetail hub is precision ground to a rough form or dovetail having a generally H or I configuration with grooves on opposite sides thereof forming reference datum surfaces.

The preform is then fixtured around the rough dovetail in a conventional electrochemical machining (ECM) machine in which a pair of electrode tools or plates are translated together on opposite sides of the airfoil stub to electrochemically machine away material therefrom and form a precisely configured airfoil within the required small tolerances thereof expressed in a few mils.

Electrochemical machining is a conventional practice in which the preform and electrode plates are electrically powered as anode and cathode, respectively, and a liquid electrolyte is circulated in the gaps therebetween. ECM removes material from the airfoil stub as the opposite plates are translated inwardly toward each other to reach the final thickness and shape of the airfoil corresponding to the complementary profiles of the two electrode plates.

Since the airfoil is now machined to its final configuration and surface finish, it must be suitably protected during subsequent manufacturing processes by typically being encapsulated in a suitable soft metal matrix such as tin and bismuth.

The encapsulated airfoil may then be suitably fixtured again in a precision grinding machine so that the rough dovetail may be precision ground to an intermediate rough tang shape that closely encloses the desired configuration of the final dovetail. Precision grinding exerts substantial loads on the preform, which loads must be suitably supported in the corresponding fixtures therefor. Since the initial airfoil stub is oversized, a relatively simple fixture or clamp may be used for supporting the stub.

However, the machined airfoil has its final dimensions and surface finish, and simple fixturing thereof could lead to unacceptable damage to the airfoil, and therefore the airfoil is protected by encapsulation which encapsulation may then be simply fixtured in the grinding machine.

Following grinding of the finished tang, the final configuration of the dovetail may then be obtained in any conventional machining process, such as by additional precision machining of the individual dovetail tangs or lobes thereof.

When the dovetail is finally machined, the airfoil may then be unencapsulated by simply melting the soft metal matrix therefrom. The preform now includes finally finished airfoil and dovetail and integral platform therebetween, and then undergoes typical finishing processes such as trimming the length of the airfoil to the required tip height, for example.

The separate processes typically required in machining the preforms to the finally configured rotor blades typically require multiple machines and multiple operators, which also correspondingly increases the attendant costs.

In view of the large number of blades required in each stage of the turbine engine, the compressor blades are typically processed in relatively large batches. For example, eight of the preforms may typically undergo precision grinding at one time to form the rough dovetails. Forty of the preforms may undergo precision grinding around the perimeter of a supporting fixture to form the rough tangs thereof.

The ECM process is typically conducted on a single blade at a time since the electrode plates are form fit to complement the generally concave pressure side of each airfoil and the generally convex suction side of each airfoil which typically vary from root to tip and between leading and trailing edges.

Although the batch processing of the preforms permits simultaneous machining thereof for reducing processing time, processing time is nevertheless increased for the additional time needed to fixture the individual blades in the grinders. Additional time is also required for encapsulating each of the multitude of blades, and later unencapsulating those blades. And, the large batch processing of the preforms renders uneconomical the processing of fewer blades when required for lower production requirements.

Accordingly, it is desired to provide an improved process for electromachining rotor blades for reducing the complexity thereof and promoting efficient manufacture of small batches.

BRIEF DESCRIPTION OF THE INVENTION

A preform includes an airfoil stub and a dovetail hub. The hub first undergoes electrochemical discharge machining to form a rough dovetail. The airfoil stub undergoes electrochemical machining to form an airfoil. The rough dovetail then undergoes electrochemical discharge machining to form a rough tang. The rough tang is finish machined to form a dovetail extending from the airfoil in a unitary rotor blade.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
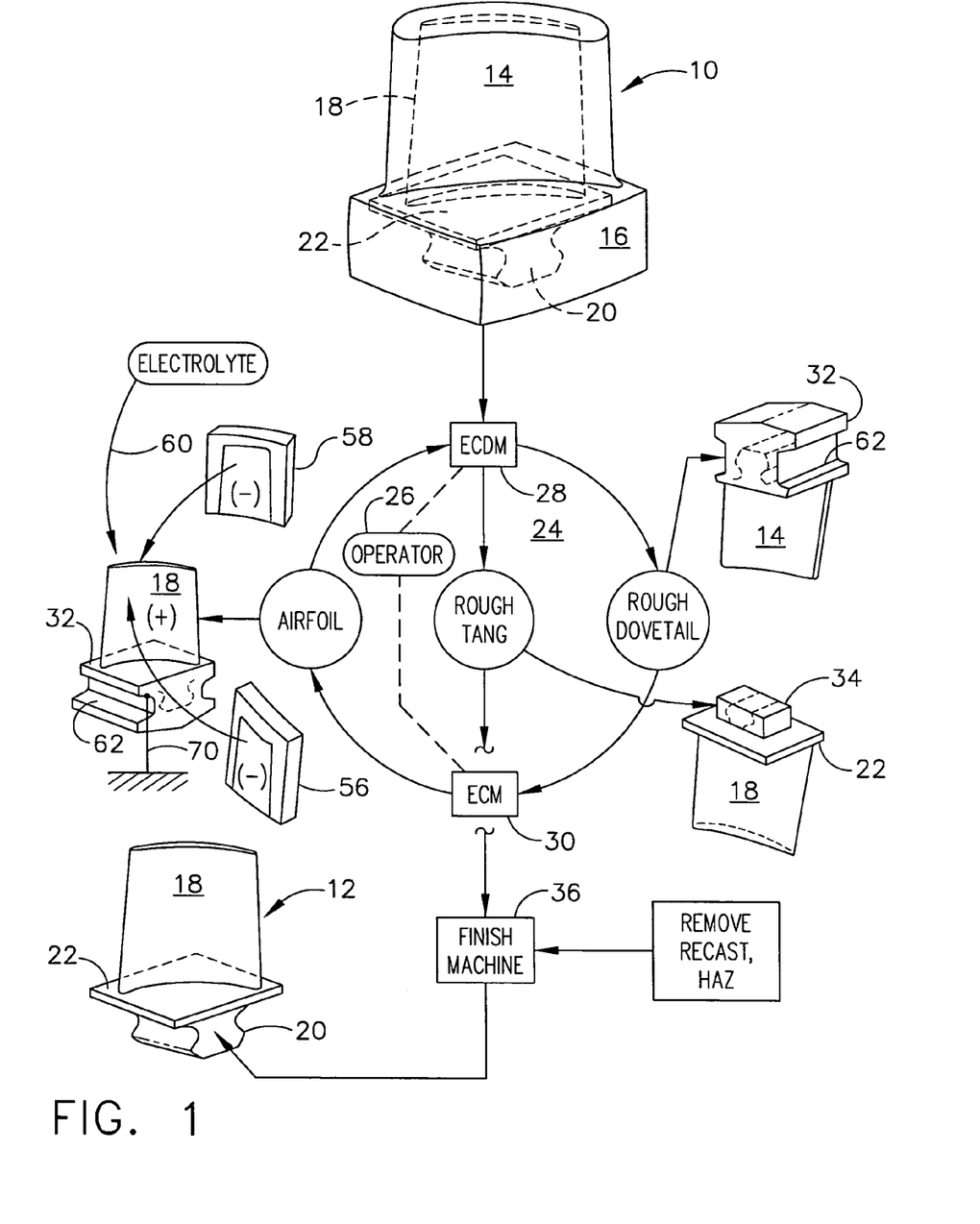
FIG. 1 is a schematic flowchart of a method of making a rotor blade from an initial preform.

Illustrated in FIG. 1 is a workpiece or preform 10 which requires machining for making a final product such as a rotor blade 12 for use in a gas turbine engine (not shown). As indicated above, the typical gas turbine engine includes multiple stages of compressor rotor blades, such as the rotor blade 12, which are suitably mounted to the perimeter of a supporting rotor disk (not shown).

The preform 10 includes a first portion in the form of an airfoil stub 14 integrally formed with a second portion in the different form of a dovetail hub 16. The preform is formed of a suitable metal, such as a nickel superalloy having enhanced strength for the hostile environment of the gas turbine engine. The preform may be formed in any conventional manner such as the upsetting process described above.

The preform is suitably larger in size than the finally desired rotor blade 12, with the airfoil stub 14 corresponding with the final first part of the product such as an airfoil 18 of the rotor blade, but initially being slightly larger for permitting precise removal of material therefrom.

The dovetail hub 16 of the preform corresponds with the final second and different part of the product such as both the final dovetail 20 and the integral platform 22 which defines the radially inner boundary for the air being pressurized in the compressor.

The rotor blade 12 may have any conventional configuration, with the airfoil 18 typically extending longitudinally in span from a root at the platform to a radially outer tip, and extending axially in chord between opposite leading and trailing edges. The airfoil includes a generally concave pressure side, and an opposite, generally convex suction side which vary in thickness between the leading and trailing edges and from root to tip in the typical manner.

The platform 22 is generally rectangular and flat and conforms with the collective circumference of the full row of blades when mounted to the perimeter of the supporting disk. The dovetail 20 is conventional in either axial-entry form, or circumferential-entry form as illustrated.

Illustrated schematically in FIG. 1 is an electromachining cell 24 that may be conveniently operated by a single operator 26.

The cell 24 includes a first machine 28 specifically configured for performing electrochemical discharge machining (ECDM) of the preform 10. The cell also includes a second machine 30 specifically configured for performing electrochemical machining (ECM) of the airfoil stub 14 to form the final airfoil 18. A single first machine 28 and a single second machine 30 may be located closely adjacent or near to each other in the single cell 24 operated the single operator 26.

The cell 24 permits electrical erosion machining of the preform 10 in a new and improved sequence for making the final rotor blade 12. The process begins by providing the preform 10 previously manufactured in any conventional manner.

The preform is initially machined by first electrochemical discharge machining the dovetail hub 16 thereof to form a first or intermediate rough form or shape such as the rough dovetail 32 that has a generally H profile transverse to the airfoil stub 14, or a generally I profile longitudinally aligned with the stub.

The preform 10 is then removed from the first machine 28 by the single operator and mounted in the second machine 30 wherein the airfoil stub 14 undergoes electrochemical machining to form the final first part or finished airfoil 18 precisely configured in dimensions between leading and trailing edges and from root to tip, and along the opposite pressure and suction sides thereof within a tolerance of less than a few mils.

The preform is then removed by the operator 26 from the second machine 30 and reinstalled into the same first machine 28 to undergo second electrochemical discharge machining of the rough dovetail 32 to form an intermediate second form or shape such as a rough tang 34 which is a small rectangular block more closely matching the final envelope of the dovetail 20 itself.

The second machine 30 may have any conventional configuration for electrochemical machining the airfoil of a rotor blade. The outer surface of the platform 22 may also undergo ECM in the same machine if desired. The underside of the platform 22 may be formed in the common second ECDM machining of the rough tang 34.

A particular advantage of combining both the first and second machines 28,30 in the common cell 24 is the ability for a common operator 26 to operate both machines as required in sequentially making rotor blades 12 from corresponding preforms 10. The ECDM process itself is conventional and utilizes electrical energy to rapidly remove or erode metal from the preform with a resulting rough surface finish which is clearly not acceptable by itself for the fine surface finish and precise dimensions required in the finished rotor blade 12.

Nevertheless, the two machines are operated for compound electromachining of the preform 10 in stages to take advantage of the different benefits of the two different types of machines 28,30 for both rapidly removing bulk material from the preform while also precisely finishing the airfoil 18 itself.

One or more conventional finish machines 36 may then be used to finish machine the rough tang 34 to the final dovetail 20 extending below the final airfoil 18 in the unitary rotor blade 12, having the integral final platform 22 therebetween. The finish machine 36 may also be used for cutting the airfoil 18 to the proper length by grinding away a portion of the distal tip thereof.

For example, the finish machine 36 may be a precision grinding machine of any conventional configuration which is specifically used to form the final profile of the dovetail 20 that has two opposite lobes or tangs, for example with the precision grinding also being effective for removing both the recast layer and the heat affected zone (HAZ) that occur during the ECDM process. ECDM uses high current electrical power that generates high thermal temperatures as material is eroded from the preform, some of which eroded material is redeposited as the recast layer, with the high temperature decreasing the metallurgical properties of the preform in the thin heat affected zone surrounding the rough tang 34.

Accordingly, the single electromachining cell 24 illustrated schematically in FIG. 1 provides multistage or compound electromachining of the single preform 10 in a circuitous process path starting in the first machine 28, continuing in the second machine 30, returning to the first machine 28, and then bypassing the second machine 30 for final processing in the finish machine 36 in the preferred embodiment.

Figure 2:
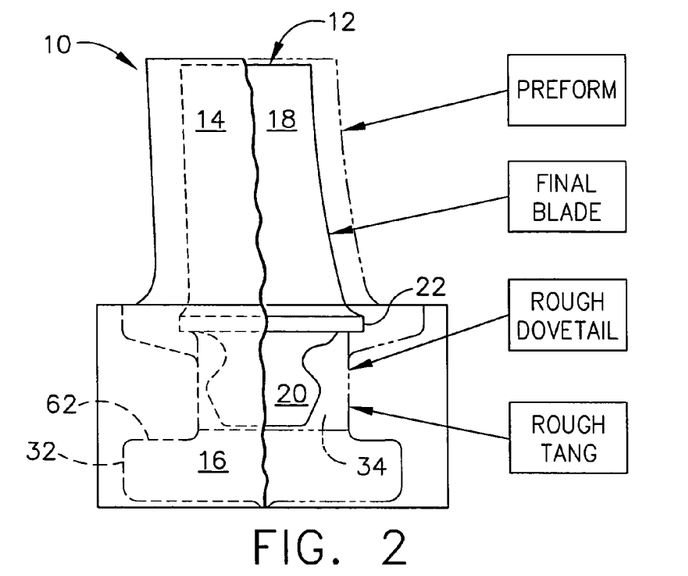
FIG. 2 is a partly sectional elevational view of the preform illustrated in FIG. 1 and the resulting finally configured rotor blade machined therefrom.

In FIG. 1, the different in-process stages of machining the preform 10 in sequence are illustrated separately. In FIG. 2, the preform 10 is illustrated in side elevation view, along with a cutaway view of the final rotor blade 12 machined therefrom by removing excess material from the preform. And, FIGS. 3-5 illustrate schematically the first ECDM machine 28 specifically configured with suitable means for performing both the first ECDM of the hub 16 to form the rough dovetail 32, followed in sequence by the second ECDM of the rough dovetail 32 to form the rough tang 34.

Figure 4:
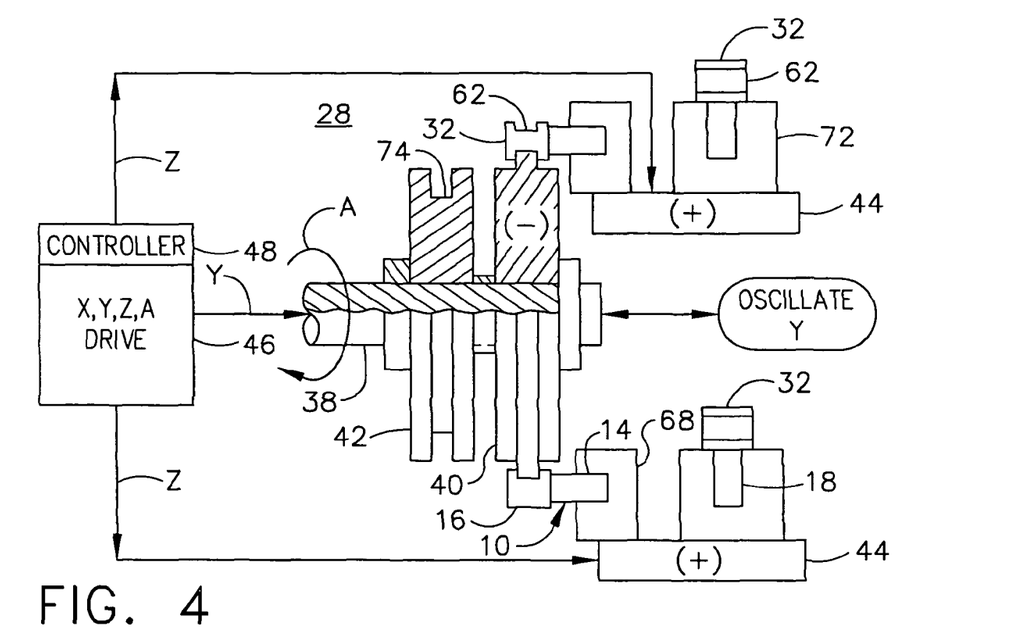
FIG. 4 is a schematic, side elevational view of the ECDM machine illustrated in FIG. 3, and taken along line 4-4.
Figure 5:
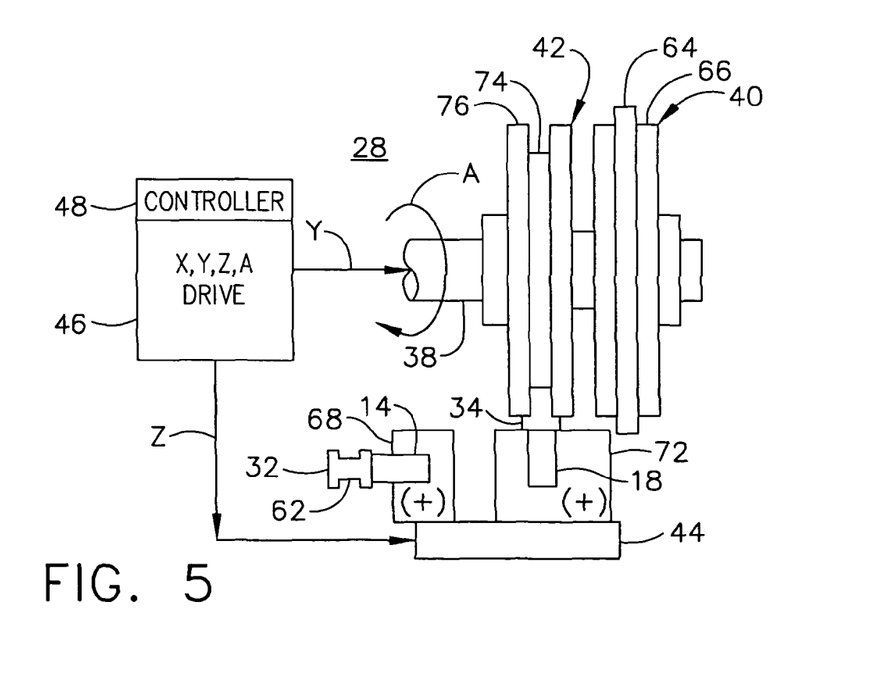
FIG. 5 is a side elevational view of the ECDM machine illustrated in FIG. 3, like FIG. 4, showing additional use of the machine in removing material from the preform.

In order to efficiently conduct ECDM with substantially high rates of material removal, the first machine 28 illustrated in FIGS. 4 and 5 includes a common rotary spindle or arbor 38 suitably driven by a corresponding electrical motor. The arbor is configured for commonly supporting thereon both a first electrode tool cutting disk 40, and a different, second electrode tool cutting disk 42 spaced axially therefrom. The first disk 40 is specifically configured for performing the first ECDM on the dovetail hub 16, and the second disk 42 is specifically configured for performing the second ECDM on the rough dovetail 32 previously formed by the first ECDM.

The first machine 28 also includes a translation table 44 upon which one or more of the preforms 10 may be suitably fixtured and mounted for engaging the spinning or rotating disks during operation.

Figure 3:
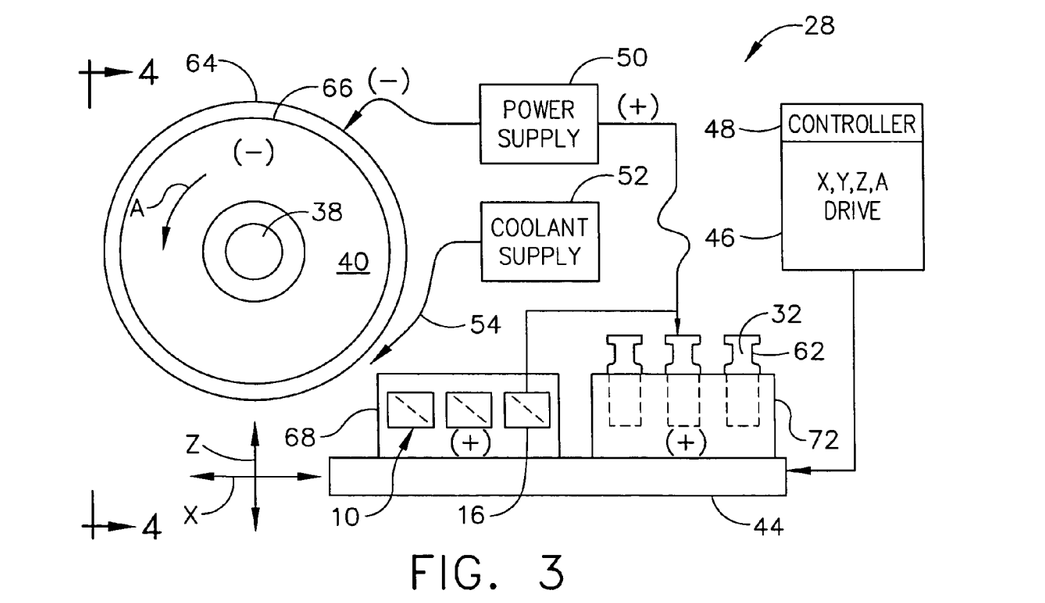
FIG. 3 is a schematic, front elevational view of the ECDM machine illustrated in FIG. 1 for removing material from the preform.

As shown in FIGS. 3-5, the arbor 38 is fixedly mounted in the first machine 28 in one location, and is suitably driven by an electrical motor to spin both disks 40,42 fixedly attached to the arbor about a rotary direction or axis A. Correspondingly, the supporting table 44 is suitably mounted in the first machine for preferably two axis X,Z translation movement thereof to precisely position the preforms to separately engage the two disks 40,42 for performing ECDM thereof.

As described further hereinbelow, the arbor 38 may be additionally mounted in the machine for oscillating translation movement thereof along its longitudinal or centerline axis Y.

Suitable electrical motors and mechanical drive systems 46 are provided for effecting and coordinating the four degrees of motion X,Y,Z,A under the control of a suitable controller 48. The controller 48 is in the preferred form of a digital computer for effecting conventional computer numerical control (CNC) of all operating components of the first machine.

As shown in FIG. 3, the first machine 28 also includes a conventional DC power supply 50 having electrical leads suitably joined to the disks 40,42 as electrical cathodes (−), and to the one or more preforms 10 mounted on the table 44 as electrical anodes (+). A suitable coolant supply 52 is also provided for the first machine 28, and includes suitable conduits and nozzles and associated housings for channeling a suitable liquid coolant 54 in the small gap maintained between the spinning tools and the preforms as they undergo ECDM.

The first ECDM machine 28 illustrated schematically in FIGS. 3-5 may be modified from a conventional three axis X,Y,Z precision CNC grinding machine in which the two electrode disks 40,42 would be mounted on the arbor 38 instead of the grinding wheel. The basic grinding machine would then be further modified to include the power supply 50 and coolant supply 52, and the optional oscillation axis Y for the arbor.

The same first machine 28 illustrated in FIGS. 3-5 is used in two different operations for conducting the first and second ECDM operations on the same preform 10 in compound electromachining with the second ECM machines 30. The first and second ECDM operations include the differently configured first and second electrode disks 40,42 rotating at suitable speed to electrically erode at a relatively high material removal rate excess superalloy metal from the preform to first form the first shape rough dovetail 32 from the dovetail hub 16 followed in turn by forming the different second shape rough tang 34, with the ECM operation of the airfoil being conducted therebetween.

During ECDM, the coolant supply 52 effects means for circulating the liquid coolant 54 as an electrolyte between the hub 16 as it translates with the table 44 across the different spinning disks 40,42 in turn. The electrical power supply 50 effects means for electrically powering the hub 16 and disks 40,42 to generate or effect electrical sparks or arcing in the small gap maintained between the hub and spinning disks to electrically erode material from the hub 16.

Electrochemical discharge machining (ECDM) is a conventional process that is fundamentally different than conventional electrochemical machining (ECM) and conventional electrical discharge machining (EDM), and is used for the rapid removal of material from the workpiece which correspondingly leaves a rough surface finish, a recast layer of redeposited material, and shallow heat affected zone (HAZ).

Two examples of ECDM are found in U.S. Pat. Nos. 6,562,227 and 6,787,728 both assigned to the present assignee, and incorporated herein by reference. An example of ECM is found in U.S. Pat. No. 4,851,090,also assigned to the present assignee, and incorporated herein by reference. Various features of these exemplary patents may be incorporated in the first and second machines 28,30 for performing the respective ECDM and ECM processes therein as specifically configured for compound electromachining.

For effective ECDM, the two electrode disks 40,42 are formed of an electrically conductive material, preferably having suitable thermal resistance, such as effected by copper or copper and tungsten material for improving the tool life, and typically lowering unit cost.

The coolant 54 both removes the significant heat generated during operation and effects a cutting fluid through which the electrical circuit is completed between the preform and cutting disks. The coolant 54 may range from an electrolyte to nearly a dielectric, and is preferably a weak electrolyte containing anti-rust additives. A suitable coolant is sodium bicarbonate in water.

The coolant is injected under pressure in the gap formed between the preform and spinning disk to complete the electrical circuit and flush away the material eroded from the preform during operation. The spinning disk distributes the thermal load around the perimeter thereof and also assists in removing the substantial heat generated during operation.

The first machine 28 is specifically configured with a DC power supply having an operating voltage range from 5 to 35 VDC, with a substantially high electrical current capacity of 1,000-5,000 amperes, for example, at about 250-900 amperes per square inch.

The controller 48 of the first machine coordinates translation of the supporting table 44 to precisely feed the individual preform along a linear feedpath aligned with the spinning perimeter of the electrode disk to maintain a small working gap therebetween in which electrical sparks or arcs are generated for thermally eroding material from the preform.

As indicated above, ECDM is fundamentally different than ECM used in the second machine 30. The second machine 30 illustrated schematically in FIG. 1 also includes a conventional electrical power supply and liquid electrolyte supply, as well as corresponding carriages for precisely moving a pair of different electrode tool plates 56,58 relative to the airfoil stub 14 for electrochemically machining material therefrom.

The first plate 56 has a generally convex cutting surface which matches or complements the desired generally concave pressure side surface of the resultant airfoil 18. The second plate 58 includes a generally concave cutting surface which complements the generally convex suction side surface of the airfoil 18.

A liquid electrolyte 60 is suitably circulated during operation between the airfoil stub 14 and the two electrode plates 56,58. Electrical power is provided to the stub 14 as an anode and to the two cutting plates 56,58 as cathodes to electrochemically remove material from the stub 14 as the two plates 56,58 are translated together on opposite sides of the stub for maintaining small gaps therebetween through which the electrolyte is circulated.

The second machine 30 also includes a suitable controller which coordinates movement of the electrode plates 56,58 relative to the stub 14, as well as controls the electrical power supply to intentionally detect and avoid any electrical sparking or arcing between the plates and hub during the electrochemical machining operation.

ECM is a precision machining process that precisely removes material from the workpiece and simultaneously forms an exceptionally smooth surface finish for achieving the desired precise final dimensions having tolerances substantially smaller than a few mils.

Accordingly, the first ECDM machine 28 is specifically configured for using the rotary cutting disks 40,42 and quickly eroding material from the preform using the high thermal energy found in the electrical sparks or arcing between the preform and the electrode disks. In contrast, the second ECM machine 30 uses the precision translation of the two electrode plates 56,58 for precisely removing material at a correspondingly smaller rate using electrochemical machining without effecting sparks between the preform and electrode plates.

As shown in FIGS. 3 and 4, the original preform 10 is suitably fixtured horizontally or laterally from its airfoil stub 14 on the table 44 to expose one or both sides of the hub to the first rotating disk 40 for cutting a groove 62 therein.

Correspondingly, the first disk 40 as shown in FIG. 5 has a perimeter profile with a center plateau or ridge 64 bounded on opposite sides by smaller diameter side lands 66 specifically configured to form the desired profile of the groove 62 across the side of the hub 16. The full depth of the groove 62 may be formed in one pass of the first disk across the dovetail hub.

Since this first ECDM operation has available the oversized airfoil stub 14, the preform may be mounted to the table 44 with a relatively simple first fixture 68 providing mechanical clamps on the stub 14 itself to rigidly mount the preform to the table 44.

The first fixture 68 illustrated schematically in FIGS. 3 and 4 may be configured for mounting a single preform therein, or a small batch of three preforms aligned together in a common horizontal plane if desired. In this way, the supporting table 44 may be translated along the X axis to engage the perimeter of the spinning first disk 40 first with one side of the hub 14 to cut a first groove 62 therein, and then passing the same first disk 40 along the opposite second side of the same hub 14 to cut an identical second groove 62 therein.

FIG. 4 illustrates that the preforms extend laterally outwardly and overhang one side of the table 44, and the table 44 may be first passed under the spinning first disk 40 in one pass, and then raised in elevation along the Z axis for again being passed atop the first disk 40 for forming the opposite groove in the hub.

In this way, the opposite grooves may be formed in the original dovetail hub 16 to form the rough dovetail 32 having opposite grooves 62 in the side faces thereof which form a generally H profile transversely to the airfoil stub 14, or a generally I profile in longitudinal alignment with the stub 14. Each groove 62 may be formed in single, or multiple, passes of the first disk 40 across the respective faces thereof.

The rough dovetail 32 formed in the first ECDM illustrated in FIG. 1 then includes the opposite first and second grooves 62 in the sides of the hub which grooves may then be conveniently used for providing a reference datum for subsequent machining of the airfoil stub 14. The preform is removed by the operator from the first machine 28 and suitably fixtured in the second machine 30, with the two grooves 62 providing the reference datum for accurately machining the airfoil stub relative thereto.

The rough dovetail 32 is mounted in a suitable fixture 70, shown schematically in FIG. 1, at the corresponding grooves 62, and the two electrode plates 56,58 may then be translated together on opposite sides of the airfoil stub for undergoing ECM thereof to machine the final airfoil 18 relative to the reference datum defined by the two grooves 62.

As indicated above, ECM is a conventional process previously used following the conventional precision grinding of the rough dovetail in conventional practice. However, whereas the previous rough dovetails were formed by precision grinding, the present rough dovetails may be more quickly and efficiently formed by ECDM as described above.

After machining the airfoil 18 in the second machine 30, the operator 26 removes the preform from the second machine and reinstalls the preform in the first machine 28 for next machining the rough tang 34. FIGS. 3-5 illustrate that the preform 10 is now fixtured vertically from the previously machined airfoil 18 atop the table 44 to expose the bottom of the rough dovetail 32 to the second cutting disk 40 which is used for forming the rough tang 34.

FIGS. 3-5 also illustrate schematically a second fixture 72 which may have any suitable form for clamping the individual preform vertically or perpendicular atop the table 44 with the machined airfoil 18 extending down into the fixture, and the rough dovetail 32 extending perpendicularly upwardly from the table. The second fixture 72 may include suitable mechanical clamps that capture the opposite sides of the airfoil 18, and one or more of the preforms may be mounted in the second fixture 72, with three of the preforms being mounted therein in a small batch.

As indicated above, the rough dovetail 32 includes the side grooves 62 which form the reference datum used in the second machine 30 for precisely machining the final airfoil 18 relative thereto. Correspondingly, the now machined airfoil 18 is mounted in the second fixture 72 to provide a corresponding reference datum for now precisely forming the rough tang 34 relative to the airfoil. Since the rough tang is now formed in the second ECDM operation, conventional encapsulation of the airfoil 18 is no longer required, and the airfoil may therefore be fixtured in the second fixture 72 without encapsulation thereof.

As indicated above, the machined airfoil in the previous manufacturing process required encapsulation with the soft metal matrix for rigid support in the precision grinding machine previously used to form the rough tang. Grinding imparts substantial loads on the preform, and the encapsulation of the airfoil may readily withstand those applied loads without damaging the premachined airfoil.

The ECDM machine 28 is not only effective for rapidly removing material from the preform, but does so with relatively small reaction loads carried through the preform to its mounting fixture due to the electrical erosion of the preform.

The second cutting disk 42 is illustrated in FIGS. 4 and 5 and is specifically configured to conform with the desired profile of the rough tang 34. For example, the second disk 42 has a perimeter profile including a center groove 74 bounded on opposite sides by larger diameter side lands 76 as best illustrated in FIG. 5.

As shown in FIGS. 3 and 5, the second cutting disk 42 passes along the exposed bottom of the initially rough dovetails 32 vertically mounted in the second fixture 72 as the table 44 is translated along the X axis to simultaneously cut away both sides grooves 62 and surrounding material from the rough dovetail 32 to form the rough tang 34. The center groove 74 and side lands 76 are configured to machine the desired profile of the rough tang 34 and bottom surface of the platform 22 as shown in FIGS. 1 and 5, in preferably in one pass across the second disk 42, or in multiple passes as desired.

The resulting rough tang 34 is a small rectangular block centered in the underside of the platform 22 and more closely surrounds the intended form of the final dovetail 20 hidden therein.

FIGS. 3-5 illustrate that several of the preforms 10 may be simultaneously mounted to the common table 44 using the respective fixtures 68,72. In this way, the same ECDM machine 28 may be operated with the two different cutting tools 40,42 thereon to machine the preforms in various steps for maximizing efficiency.

For example, FIG. 4 illustrates the in-process machining of some of the preforms to first form one of the grooves in the side of the hubs 16, and then the opposite groove in the opposite side of the hubs. After the rough dovetails 32 are so machined, they are transferred to the second machine 30 illustrated in FIG. 1 wherein the airfoils 18 are precisely machined. Those preforms are then returned to the same first machine 28 illustrated in FIG. 4 and are now remounted in the second fixtures 72 specifically configured for now mounting the machined airfoils 18.

However, multiple preforms 10 may also be mounted in the first fixture 68 so that both fixtures now contain their full complement of preforms in various stages of machining. The first machine 28 as illustrated in FIG. 5 may then be operated to machine the rough dovetails 32 using the second cutting disk 42 for forming the rough tangs 34.

In this way, the same ECDM machine 28 may be used in series stages for first machining the rough dovetails 32 from the initial airfoil stubs 14, and secondly machining the rough tangs 34 from the premachined rough dovetails 32, and following the electrochemical premachining of the airfoil 18 from their corresponding airfoil stubs 14.

The rough dovetail 32 may be formed in a single pass of the corresponding first cutting tool 40, and the rough tang 34 may also be formed in a single pass of the second cutting disk 42. Or, multiple passes of these cutting tools 40,42 may be used to form the rough dovetail and tangs as desired in successive skimcuts.

For example, the first cutting disk 40 as illustrated schematically in FIG. 4 may be configured and operated during the ECDM process for cutting the grooves 62 in opposite sides of the hub in sequential passes, and under lateral oscillation along the Y axis to more precisely form the resulting grooves 62. The first disk 40 may be operated to initially cut the grooves 62 to just short of their required depth. A second pass of the first disk 40 may then be used with a suitably rapid lateral oscillation of the first disk from side to side to machine away relatively thin skimcuts on opposite surfaces of each of the grooves 62 to improve the reference datum surface finish thereof.

The grooves 62 and their reference datums are necessary for the subsequent machining of the airfoil 18 in the second machine 30, and then are no longer needed. Accordingly, the second cutting disk 42 is configured to simultaneously cut away both grooves 62 of the rough dovetail 32 to form the simple rectangular block rough tang 34.

As indicated above with respect to FIG. 1, the preform 10, with the finished airfoil 18 and rough tang 34, is then removed from the first machine 28 and subsequently mounted in one or more of the finish machines 36 as desired to machine the rough tang 34 into the final form of the dovetail 20, which will simultaneously remove the recast and HAZ found in the rough tang 34. The premachined airfoil 18 may be used in the finish machines 36 to provide the reference datum for the final machining of the dovetail 20 in a conventional manner.

The compound electromachining cell 24 illustrated schematically in FIG. 1 permits a single operator 26 to efficiently manage both the first ECDM machine 28 and the second ECM machine 30 for efficiently machining one or more of the preforms in sequence. The first machine 28 is used to advantage to rapidly remove material from the airfoil stub 14 in stages to form first the rough dovetail 32 and then form the rough tang 34 following the intermediate electrochemical machining of the airfoil 18.

These sequences may be conducted using relatively simple fixtures in both machines, and eliminating the need for encapsulation of the machined airfoil 18 for forming the rough tang 34.

The two cutting disks 40,42 may be separately configured for machining the desired forms of the side grooves in the rough dovetail 32 and desired form of the rough tang 34. The two disks 40,42 may be operated in multiple passes to machine the dovetail hub in stages, with a final skimcut of less than about 20 mils.

Oscillation of the first disk 40 may be used in a single pass in rough cutting each of the opposite grooves 62 to improve the surface finish of those grooves. In this way, a skimcut may be eliminated.

However, a slightly improved surface finish of the two grooves 62 may be obtained if the oscillation of the first tool 40 is conducted during skim cutting to finish those grooves. Oscillation of the tool may also be used to compensate for wear of the disk sidewalls.

If desired, the same arbor 38 illustrated in FIGS. 4 and 5 may be used to additionally mount a grinding wheel pack (not shown) thereon to finish grind the desired dovetail 20 from the rough tang 34. This would eliminate a downstream operation in the manufacturing process.

However, the arbor 38 would then be configured to rotate at speeds greatly exceeding those required for spinning the two disks 40,42 during ECDM, which speeds should be about 3,000 RPM or more as required for typical grinding.

The compound electromachining cell disclosed above therefore provides many significant advantages in the in-process manufacture of compressor rotor blades from corresponding preforms. Attendant benefits include the reduction in machining time, reduction in associated costs, and the increased flexibility of machining rotor blades individually or in small batches which do not require large inventories of preforms or resulting machined blades.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A method of making a rotor blade comprising:
providing a preform including an airfoil stub and a dovetail hub;
first electrochemical discharge machining said hub using a first rotary electrode disk to form a rough dovetail;
electrochemical machining said stub to form an airfoil;
second electrochemical discharge machining said rough dovetail using a second rotary electrode disk to form a rough tang; and
finish machining said rough tang to form a dovetail extending from said airfoil in a unitary rotor blade.

2. A method according to claim 1 wherein:
said first disk includes a perimeter profile with a center ridge bounded on opposite sides by smaller diameter lands; and
said second disk includes a perimeter profile having a center groove bounded on opposite sides by a larger diameter lands.

3. A method according to claim 2 further comprising:
passing said first disk along a first side of said hub to cut a first groove therein;
passing said first disk along an opposite second side of said hub to cut a second groove; and
passing said second disk along the bottom of said rough dovetail to cut away both said first and second grooves to form said rough tang.

4. A method according to claim 3 further comprising:
circulating an electrolytic coolant between said hub and disks;
electrically powering said hub and disks to effect electrical sparks therebetween to electrically erode material from said hub;
translating together a pair of electrode plates on opposite sides of said stub;
circulating an electrolyte between said stub and plates; and
electrically powering said stub and plates to electrochemically remove material from said stub to form said airfoil while avoiding sparking.

5. A method according to claim 4 further comprising:
fixturing said stub in an ECDM machine atop a supporting table adjacent to an arbor supporting said disks; and
rotating said arbor and disks, and translating said table and preform to cut said grooves in said hub to form said rough dovetail.

6. A method according to claim 5 wherein:
said preform is fixtured laterally from said stub atop said table to expose a side of said hub to said first disk for cutting said groove therein; and
said preform is fixtured vertically from said airfoil atop said table to expose the bottom of said rough dovetail to said second disk for forming said rough tang therefrom.

7. A method according to claim 6 wherein:
said rough dovetail includes said first and second grooves on opposite sides thereof forming a reference datum; and
said rough dovetail is fixtured at said grooves during said ECDM to form said airfoil relative to said reference datum.

8. A method according to claim 7 wherein said airfoil is fixtured during said second ECDM to form said rough tang relative thereto.

9. A method according to claim 8 wherein said finish machining said rough tang comprises precision grinding thereof to remove recast and heat affected zones therefrom due to said ECDM.

10. A method according to claim 9 wherein:
said first and second ECDM are performed using a single ECDM machine for both operations; and
said ECM is performed using an ECM machine located near said ECDM machine in a common cell controlled by a single operator.

11. A method of making a rotor blade comprising:
providing a preform including an airfoil stub and a dovetail hub;
first electrochemical discharge machining said hub to form a rough dovetail;
electrochemical machining said stub to form an airfoil;
second electrochemical discharge machining said rough dovetail to form a rough tang; and
finish machining said rough tang to form a dovetail extending from said airfoil in a unitary rotor blade.

12. A method according to claim 11 wherein:
said first and second ECDM include different electrode disks rotating along said hub to electrically erode material therefrom to form said rough dovetail and said tang in turn; and
said ECM includes a pair of electrode plates translating together on opposite sides of said stub to electrochemically remove material from said stub to form said airfoil.

13. A method according to claim 12 further comprising:
circulating an electrolytic coolant between said hub and disks;
electrically powering said hub and disks to generate electrical sparks therebetween to electrically erode material from said hub;
circulating an electrolyte between said stub and plates; and electrically powering said stub and plates to electrochemically remove material from said stub while avoiding sparking.

14. A method according to claim 13 further comprising:
fixturing said stub in an ECDM machine atop a supporting table adjacent to an arbor supporting said disks; and
rotating said arbor and disks, and translating said table and preform to cut a groove in said hub to form said rough dovetail.

15. A method according to claim 14 wherein said preform is fixtured laterally from said stub atop said table to expose a side of said hub to one of said rotating disks for cutting said groove therein.

16. A method according to claim 15 wherein said one disk includes a perimeter profile with a center ridge bounded on opposite sides by small diameter lands.

17. A method according to claim 14 wherein said preform is fixtured vertically from said airfoil atop said table to expose the bottom of said rough dovetail to one of said rotating disks for forming said rough tang therefrom.

18. A method according to claim 17 wherein said one disk includes a perimeter profile having a center groove bounded on opposite sides by larger diameter lands.

19. A method according to claim 13 further comprising:
passing a first one of said rotating electrode disks along a first side of said hub to cut a first groove therein; and
passing said first rotating disk along an opposite second side of said hub to cut a second groove therein.

20. A method according to claim 19 wherein said first disk includes a perimeter profile with a center ridge bounded on opposite sides by small diameter lands.

21. A method according to claim 19 further comprising passing a second one of said rotating electrode disks along the bottom of said rough dovetail to cut away both said first and second grooves and form said rough tang.

22. A method according to claim 21 wherein said second disk includes a perimeter profile having a center groove bounded on opposite sides by larger diameter lands.

23. A method according to claim 13 wherein:
said rough dovetail includes first and second grooves on opposite sides thereof forming a reference datum; and
said rough dovetail is fixtured at said grooves during said ECDM to form said airfoil relative to said reference datum.

24. A method according to claim 23 wherein said airfoil is fixtured during said second ECDM to form said rough tang relative thereto.

25. A method according to claim 24 wherein said airfoil is fixtured during said second ECDM without encapsulation thereof.

26. A method according to claim 13 wherein said finish machining said rough tang comprises precision grinding thereof to remove recast and heat affected zones therefrom due to said ECDM.

27. A method according to claim 13 wherein:
said first and second ECDM are performed using a single ECDM machine for both operations; and
said ECM is performed using an ECM machine located near said ECDM machine in a common cell controlled by a single operator.

28. A method according to claim 27 wherein said single ECDM machine includes a common rotary arbor supporting a first one of said electrode disks for performing said ECDM, and a second one of said electrode disks for separately performing said second ECDM.

29. A method according to claim 28 wherein said ECDM machine further includes a common table having separately mounted thereon one of said preforms fixtured laterally from said stub thereof atop said table to expose a side of said hub to said first disk, and another one of said preforms fixtured vertically from said airfoil thereof to expose the bottom of said rough dovetail to said second disk.

30. A method according to claim 29 wherein:
said first disk is configured for cutting grooves in opposite sides of said hub in sequential passes, and under oscillation to form said rough dovetail; and
said second disk is configured to simultaneously cut away said grooves to form said rough tang.

31. A method of making a product comprising:
providing a preform including a stub and a hub;
first electrochemical discharge machining said hub to form a first shape;
subsequent to the first electrochemical discharge machining, electrochemical machining said stub to form a first part;
subsequent to the electrochemical machining, second electrochemical discharge machining said first shape to form a second shape; and
finish machining said second shape to form a second part extending from said first part in a unitary product.

32. A method according to claim 31 wherein:
said first and second ECDM include different electrode disks rotating along said hub to electrically erode material therefrom to form said first shape and said second shape in turn; and
said ECM includes a pair of electrode plates translating together on opposite sides of said stub to electrochemically remove material from said stub to form said first part.

33. A method according to claim 32 further comprising:
circulating an electrolytic coolant between said hub and disks;
electrically powering said hub and disks to generate electrical sparks therebetween to electrically erode material from said hub;
circulating an electrolyte between said stub and plates; and
electrically powering said stub and plates to electrochemically remove material from said stub while avoiding sparking.

34. A method according to claim 33 further comprising:
fixturing said stub in an ECDM machine atop a supporting table adjacent to an arbor supporting said disks; and
rotating said arbor and disks, and translating said table and preform to cut a groove in said hub to form said first shape.

35. A method according to claim 34 wherein said preform is fixtured vertically from said first part atop said table to expose the bottom of said first shape to one of said rotating disks for forming said second shape therefrom.

36. A method according to claim 33 further comprising:
passing a first one of said rotating electrode disks along a first side of said hub to cut a first groove therein; and
passing said first rotating disk along an opposite second side of said hub to cut a second groove therein.

37. A method according to claim 33 further comprising passing a second one of said rotating electrode disks along the bottom of said first shape to cut away both said first and second grooves and form said second shape.

38. A method according to claim 33 wherein:
said first shape includes first and second grooves on opposite sides thereof forming a reference datum; and
said first shape is fixtured at said grooves during said ECDM to form said first part relative to said reference datum.

39. A method according to claim 33 wherein said finish machining said second shape comprises precision grinding thereof to remove recast and heat affected zones therefrom due to said ECDM.

40. A method according to claim 33 wherein:
said first and second ECDM are performed using a single ECDM machine for both operations; and
said ECM is performed using an ECM machine located near said ECDM machine in a common cell controlled by a single operator.

41. A method according to claim 40 wherein said single ECDM machine includes a common rotary arbor supporting a first one of said electrode disks for performing said ECDM, and a second one of said electrode disks for separately performing said second ECDM.

42. A method according to claim 41 wherein said ECDM machine further includes a common table having separately mounted thereon one of said preforms fixtured laterally from said stub thereof atop said table to expose a side of said hub to said first disk, and another one of said preforms fixtured vertically from said first part thereof to expose the bottom of said first shape to said second disk.

43. A method according to claim 33 wherein said product is a turbine rotor blade, said first part thereof is an airfoil, and said second part thereof is a dovetail.

\* \* \* \* \*